United States Patent [19]

Peterson et al.

[11] 4,129,220
[45] Dec. 12, 1978

[54] BAR STOCK FEED APPARATUS

[75] Inventors: Anders A. Peterson, Elmira; Francis D. Catlin, Horseheads, both of N.Y.

[73] Assignee: Hardinge Brothers, Inc., Elmira, N.Y.

[21] Appl. No.: 737,914

[22] Filed: Nov. 1, 1976

[51] Int. Cl.² ............................................. B65H 5/16
[52] U.S. Cl. ........................................ 214/1.4; 82/2.5;
198/747; 214/1.5
[58] Field of Search .................. 214/1.1, 1.2, 1.3, 1.4,
214/1.5; 82/2.5, 2.7; 198/717, 736, 747

[56] References Cited

U.S. PATENT DOCUMENTS

| 3,074,566 | 1/1963 | MacBlane, Sr. | 214/1.4 |
| 3,693,810 | 9/1972 | Gumhold | 214/1.5 |
| 3,828,630 | 8/1974 | Argereu | 214/1.5 |

FOREIGN PATENT DOCUMENTS

| 481959 | 8/1929 | Fed. Rep. of Germany | 214/1.5 |
| 326244 | 1/1958 | Switzerland | 214/1.5 |
| 668353 | 3/1952 | United Kingdom | 214/1.4 |
| 750462 | 6/1956 | United Kingdom | 214/1.4 |

Primary Examiner—Frank E. Werner
Attorney, Agent, or Firm—Shlesinger, Arkwright, Garvey & Dinsmore

[57] ABSTRACT

Bar stock feed apparatus generally comprising an elongated tubular member adapted to receive a length of bar stock therein and a standard for supporting the tubular member in a feed position wherein the tubular member is aligned with the lathe spindle and in a second position wherein the tubular member is out of alignment with the spindle so that the stock can be loaded therein. A fluid actuated plunger is received in the tubular member and is advanced by pneumatic pressure supplied to the rear of the tube through an annular passageway formed by a pair of concentric tubes. A locking mechanism, which clamps the feed tube in position, includes a valve which controls the flow of air to the plunger and automatically interrupts the supply of air when the tubular member is not locked in place. A safety valve is positioned to be contacted by the tubular member when in its operative locked position and serves to bleed air from the supply line when the tubular member is not in the feed position.

23 Claims, 13 Drawing Figures

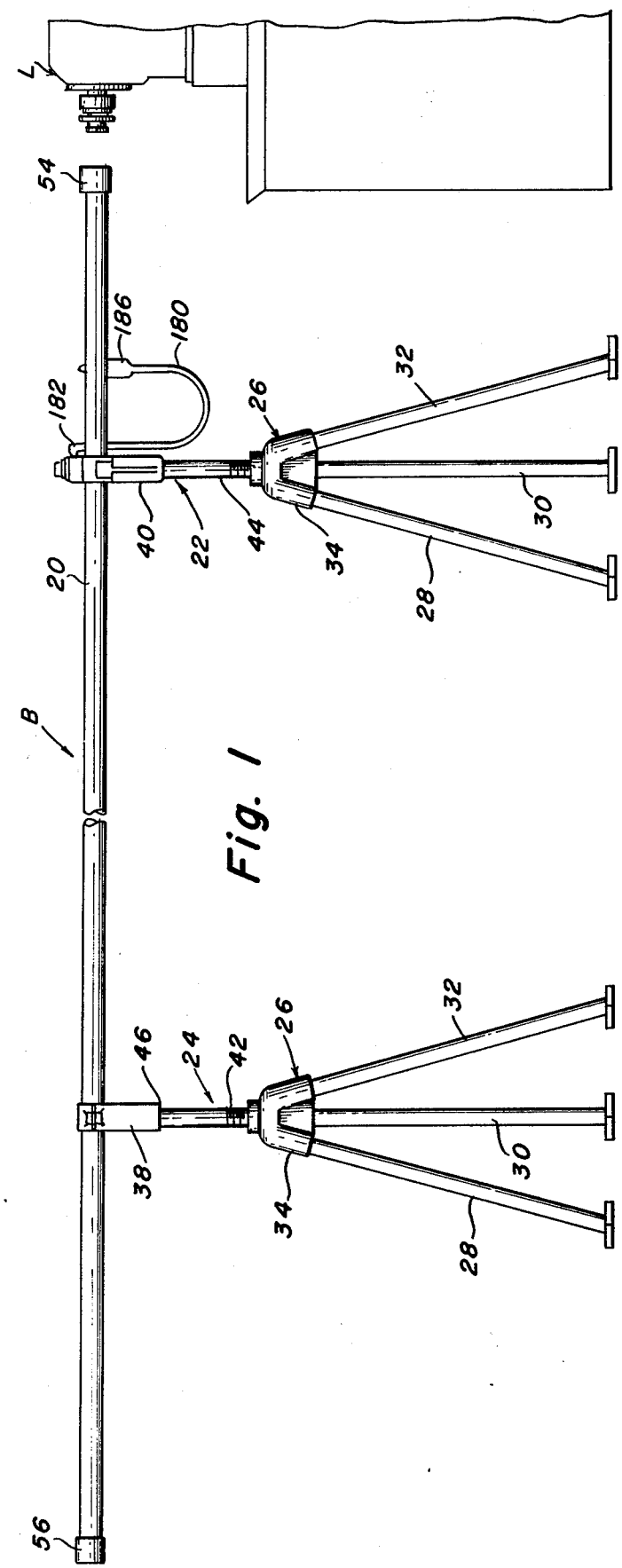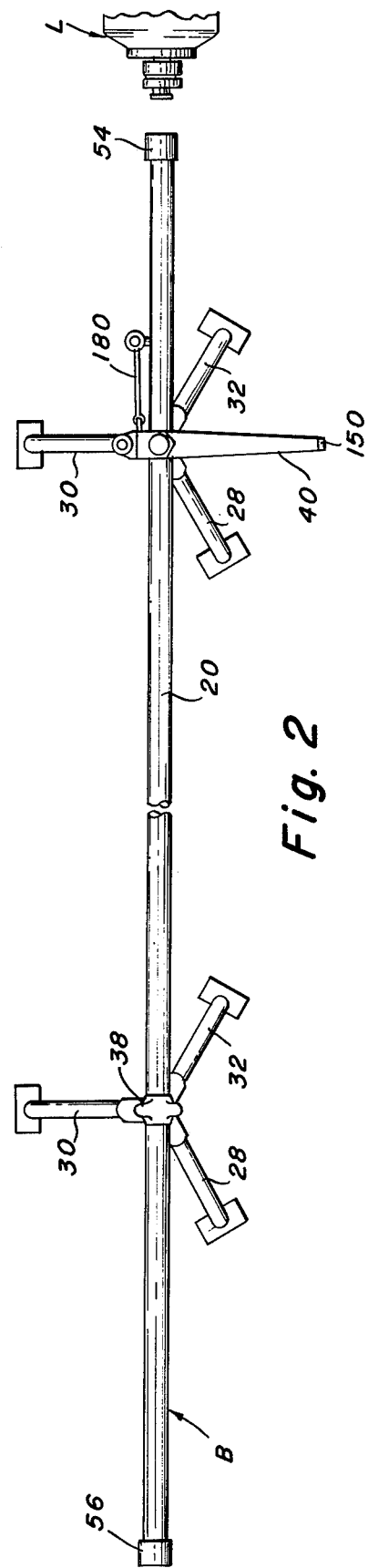

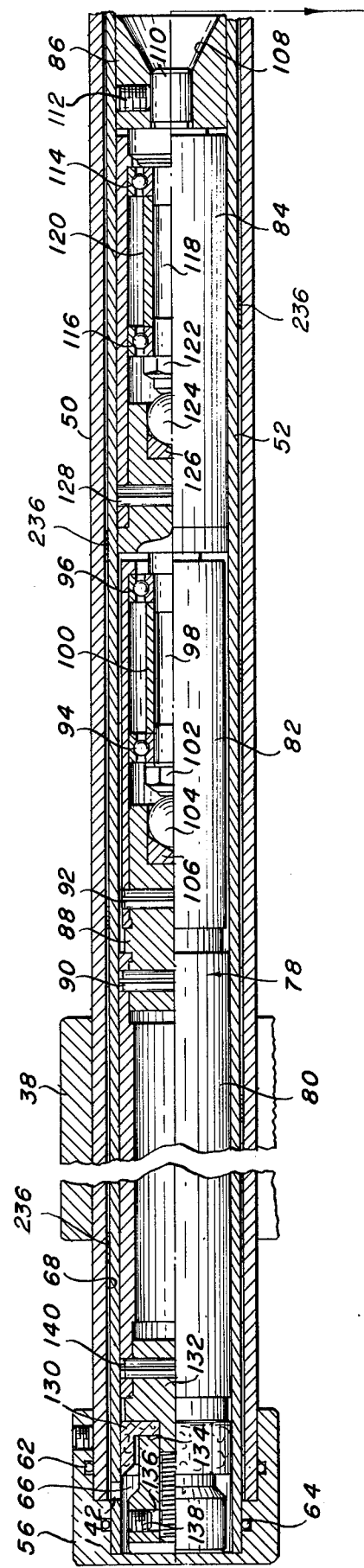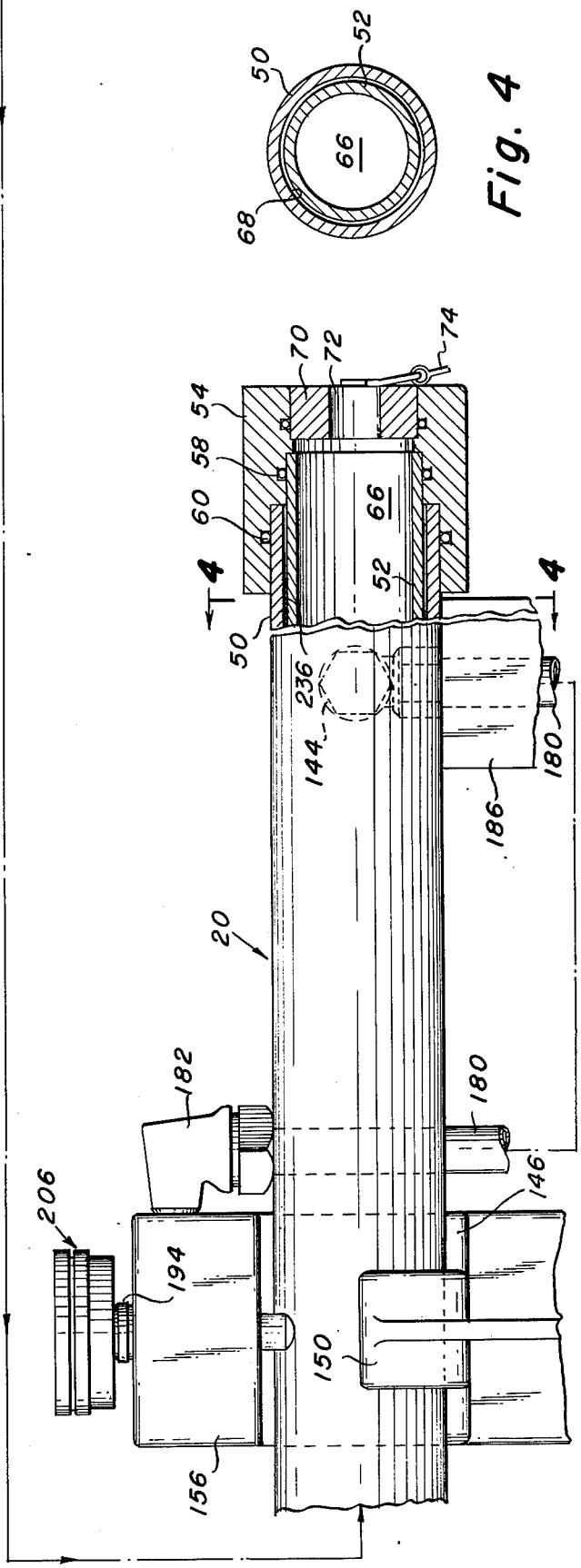

BAR STOCK FEED APPARATUS

BACKGROUND OF THE INVENTION

The invention relates to a feed apparatus for bar stock and is particularly adapted for use with metal working machines such as lathes wherein stock is fed through the rear of the spindle to the collect or chuck.

Specifically, the invention relates to a pneumatically operated bar feed wherein the bar stock is advanced through the rotating spindle by a plunger slideably received in a feed tube. The feed tube is connected to a supply of air under pressure which is admitted to the interior of the tube at a position behind the plunger. A pair of standards are provided to support the feed tube in alignment with the particular machine tool being fed.

One of the problems with bar feed apparatus of this tybe concerns controlling the supply of pneumatic pressure to the plunger when the feed tube is not properly aligned with the machine tool. If this were to occur, the bar stock would be ejected from the feed tube with the possibility of injury to the operator or damage to the machinery. U.S. Pat. No. 3,074,566 to MacBlane, owned by the assignee herein, discloses apparatus for overcoming this problem. It comprises a locking screw which opens the air supply valve only when the feed tube is clamped in the feed position. Other examples of prior art solutions to the problem include:

U.S. Pat. No. 2,300,457
U.S. Pat. No. 2,272,720
U.S. Pat. No. 2,327,916
U.S. Pat. No. 2,339,712
U.S. Pat. No. 2,892,243
U.S. Pat. No. 2,334,272

In each of these examples, the supply of pneumatic pressure to the feed tube is interrupted when the locking mechanism is moved to its unlocked position. With this arrangement, deactivation of the pneumatic supply depends on the locking mechanism alone rather than on the position of the feed tube. Since the danger of premature ejection arises when the feed tube is out of position, a much more direct and reliable means for interrupting the supply of pneumatic pressure to the plunger is to directly sense the presence or absence of the feed tube itself from the aligned position. Thus, interruption of the pneumatic pressure can operate independently from the locking mechanism so that if it is accidentally thrown to its locked position with the feed tube not in place, the feed tube will not be pressurized. Furthermore, this additional safety valve will operate effectively regardless of the feed tube diameter.

A further problem with many of the prior art feed apparatus is the noise and vibration which accompanies pneumatically operated devices. This is especially a problem in bar feeds where concentric tubes are employed to supply the working fluid to the plunger because of the tendency for the tubes to vibrate and strike each other as the stock is rotated.

OBJECTS OF THE INVENTION

It is an object of the present invention to provide bar stock feed apparatus having a safety exhaust valve which operates independently of the feed tube locking mechanism to prevent the pressurization of the feed tube in the event it is not properly positioned.

It is also an object of the present invention to provide bar stock feed apparatus having a safety exhaust valve which must be contacted by the feed tube itself before pressurization can occur.

A further object of the present invention is to provide bar stock feed apparatus having a fail-safe air supply system which requires both the proper positioning of the feed tube and locking of the feed tube in place before pressurization can occur.

A further object of the present invention is to provide an automatic air shut-off for a pneumatic bar feed which is simpler in construction than prior art devices which employ more complicated lever and toggle operated valves.

Another object of the present invention is to provide a safety exhaust valve for bar stock feed apparatus which is fully operative regardless of feed tube diameter.

A still further object of the present invention is to provide bar stock feed apparatus employing an automatically centering plunger and a plastic feed tube bushing at the stock exit opening thereby resulting in quieter operation.

Yet another object of the present invention is to provide bar stock feed apparatus having a feed tube comprising a pair of concentric tubes providing an annular passageway therebetween for the admission of pneumatic pressure to the rear of the plunger.

A still further object of the present invention is to provide bar stock feed apparatus of the concentric tube type having a vibration damping and noise reducing spacing tape between the inner and outer tubes so as to reduce operating noise.

A still further object is to provide a pneumatic feed tube having tripod supports thereby resulting in greater stability.

These and other objects will be apparent from the following specification considered together with the appropriate drawings.

SUMMARY OF THE INVENTION

Bar stock feed apparatus comprising: an elongated tubular member adapted to receive a length of bar stock therein, a standard for supporting the tubular member in an operative position for feeding the bar stock and in an inoperative position wherein the bar stock can be loaded into the tubular member, a fluid actuated plunger received in the tubular member for longitudinal movement therein, means for supplying fluid under pressure to the tubular member behind the plunger to thereby cause same to advance longitudinally within the tubular member, a locking mechanism associated with the standard including means for mechanically constraining the tubular member in its operative position and safety valve means associated with the standard responsive to the absence of the tubular member from its operative position to automatically interrupt or reduce the supply of fluid to the plunger.

The feed tube comprises a pair of concentric telescoping tubes having a spirally wound vibration damping and noise reducing strip positioned therebetween.

BRIEF DESCRIPTION OF THE DRAWINGS

FIG. 1 is a side elevational view of the present invention which is positioned to load bar stock into a lathe;

FIG. 2 is a top plan view of the apparatus shown in FIG. 1;

FIG. 3 is an enlarged view of the feed tube forming a portion of the present invention shown in partial longitudinal section;

FIG. 4 is a transverse sectional view of FIG. 3 taken along line 4—4 and viewed in the direction of the arrows;

DETAILED DESCRIPTION OF THE DRAWINGS

Figure 12:
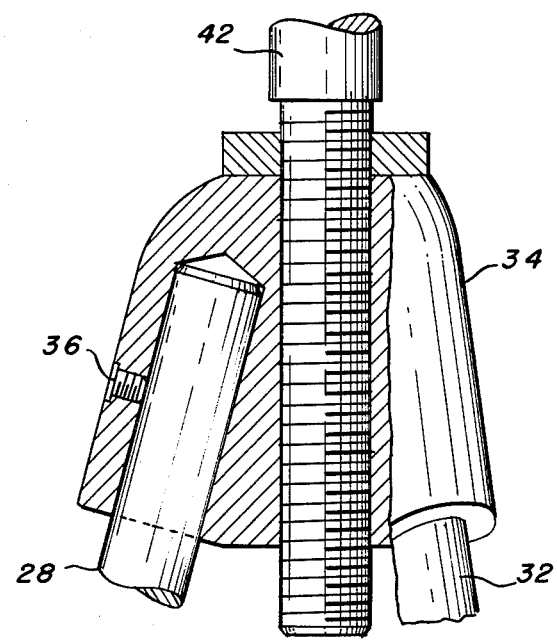
FIG. 12 is an enlarged, fragmentary sectional view of one of the tripod supports shown in FIG. 1.

Referring to FIG. 1, the bar feed apparatus B of the present invention is shown positioned behind the head stock of lathe L. It comprises an elongated feed tube 20, which is supported on a pair of standards 22 and 24, in axial alignment with the spindle of lathe L. The standards 22 and 24 each comprise a tripod 26 having three legs 28, 30 and 32 received in bracket 34. As shown in detail in FIG. 12, the legs are secured to bracket 34 by means of set screws 36. Support bracket 38 and support arm 40 are adjustable on their respective tripods 26 by virtue of adjustment posts 42 and 44 which are threadedly received in brackets 34. In order that feed tube 20 may be swung in and out of position, rear standard 24 is provided with a swivel connection 46 between rear support bracket 38 and adjusting post 42.

Referring now to FIGS. 3 and 4, the feed tube 20 is shown in detail. It comprises an outer tube 50 and an inner concentric tube 52 supported within the outer tube 50 by means of front and rear end caps 54 and 56. O-rings 58, 60, 62 and 64 seal the interior 66 of feed tube assembly 20 and annular chamber 68. A split bushing 70 is received within front end cap 54 which has an opening 72 of any one of a number of different sizes so as to be adapted for bar stock of different diameters. The two halves of the bushing 70 are connected to the apparatus by chains 74 and 76 so that when they are pushed out by the plunger as the last part of the bar stock is loaded, they will not be lost.

The plunger 78 comprises a body portion 80, a sleeve 82, a plunger guide 84 and tip 86 which are connected for unitary axial movement. Body 80 is connected to sleeve 82 by connector 88 and roll pins 90 and 92. Guide 84 is connected to sleeve 82 for relative rotation by means of bearings 94 and 96, guide support 98 and spacer 100. A lock nut 102 holds the assembly together. A ball 104 is received within connector 88 and is supported against seat 106.

Tip 86, which has a generally conical inner surface 108 is secured to plunger pilot 110 by means of set screw 112. Relative rotation between tip 86 and guide 84 is provided by bearings 114 and 116, support 118, spacer 120, lock nut 122, ball 124 and seat 126 similarly to sleeve 82. A roll pin 128 secures guide 84 to guide support 98.

In order for the feed tube 20 to be pressurized behind plunger 78, a cup packing 130 is provided. Packing 130 is secured to rear connector 132 by nut 134. Brass plug 136 and set screw 138 prevent nut 134 from backing off once it has been tightened against packing 130. Rear connector 132 is connected to body 80 by roll pin 140.

Pressurized air is admitted behind plunger 78 through annular chamber 68 and rear port 142. The air inlet into annular chamber 68 is through connector 144 in a manner which will be described in greater detail below.

Referring now to FIGS. 5–10, the supply and control of pneumatic pressure to plunger 78 will be described in detail. Arm 40 which is preferrably of a single casting, includes a generally horizontal section 146 having an upper surface 148, an upturned end 150 and a housing 152 having an arcuate recess 154 beneath overhanging portion 156.

Working fluid, for example compressed air, is supplied to the apparatus through inlet 158 which connects to regulator and filter 160. Nipple 161 connects to housing 152 and supplied fluid to check valve chamber 162 through passageway 164. When check valve 166 is opened, the compressed air flows from chamber 162 through passageways 168 and 170 to annular chamber 172 then through passageways 174, 176 and 177 to exhaust valve chamber 178. From passageway 174, the fluid is also admitted to hose 180 through port 181 and connector 182 and from there to annular chamber 68 through connector 184, oiler 186 and connector 144.

Figure 9:
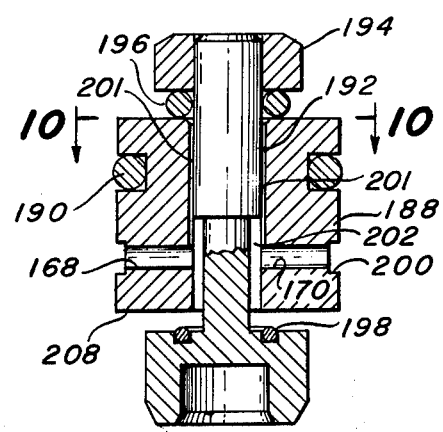
FIG. 9 is an enlarged sectional view of the check valve mechanism shown in FIG. 5.
Figure 10:
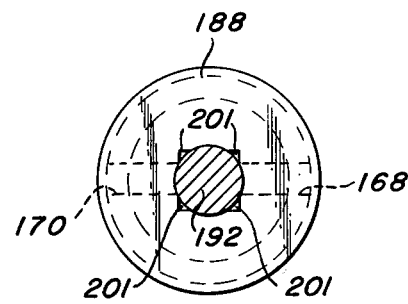
FIG. 10 is a sectional view of FIG. 9 taken along line 10—10 and viewed in the direction of the arrows.

With particular reference to FIGS. 9 and 10 the details of check valve 166 will be described. Bushing 188 is received within chamber 162 which is sealed by means of O-ring 190. The check valve stem 192 is slideably received within bushing 188 and includes a cap 194 and O-rings 196 and 198. As described earlier, bushing 188 has an annular groove 200 on its periphery and a pair of passageways 168 and 170 which extend from groove 200 to the annular space 202 between stem 192 and bushing 188. Bushing 188 is nicked as at 201 to permit the air to exhaust as plunger 78 is pushed back for reloading.

Figures 5, 5A:
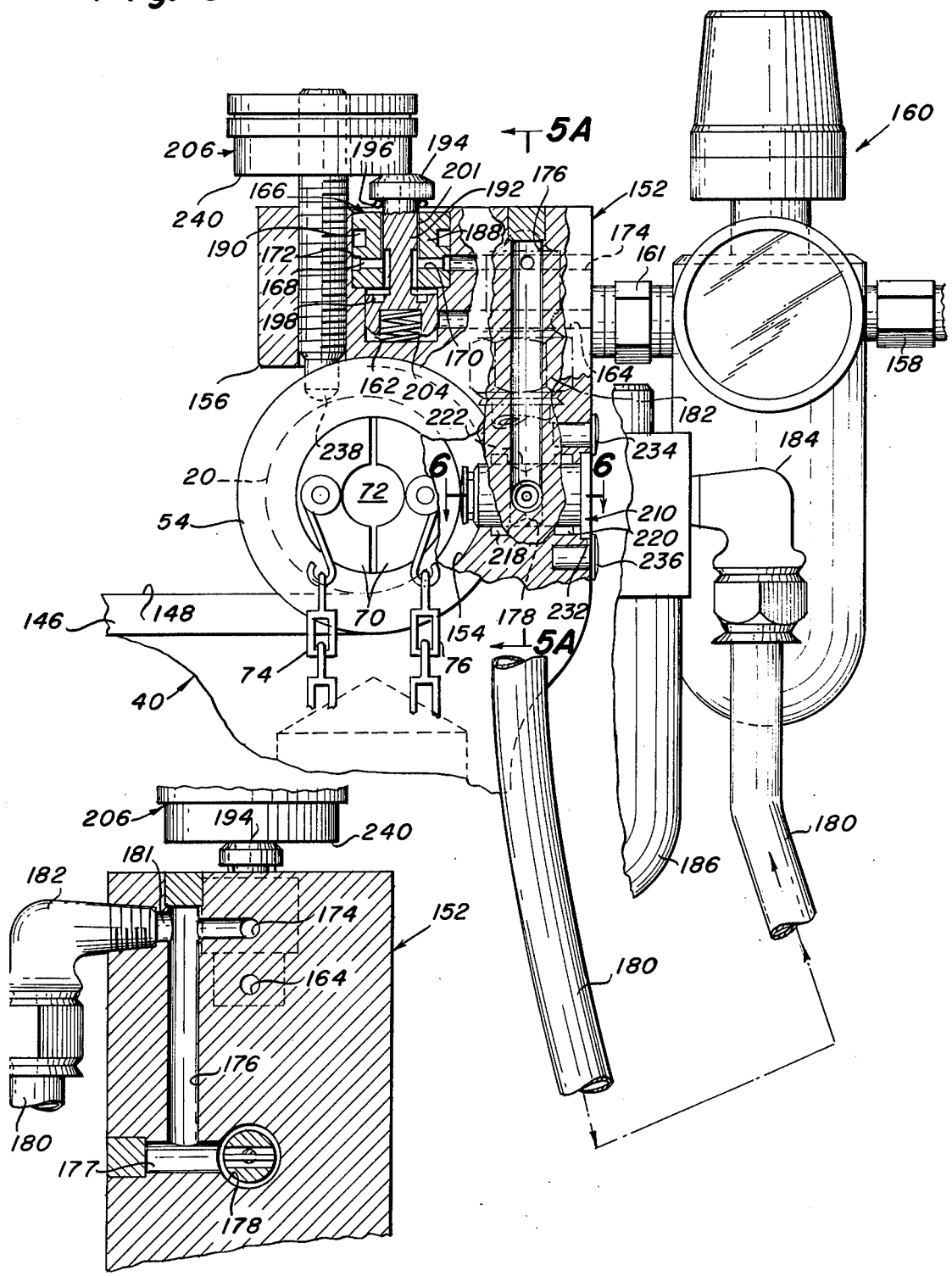
FIG. 5 is an enlarged front end view of the apparatus shown in FIG. 1 with portions thereof shown in section to illustrate the details of construction.
FIG. 5A is a sectional view of FIG. 5 taken along 5A—5A and viewed in the direction of the arrows.
Figure 6:
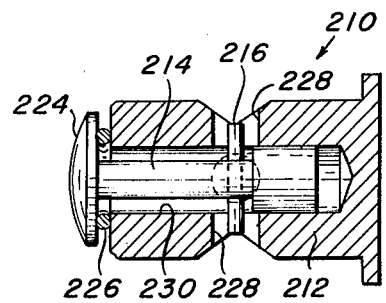
FIG. 6 is a sectional view of the exhaust valve shown in FIG. 5 taken along line 6—6 and viewed in the direction of the arrows.
Figure 7:
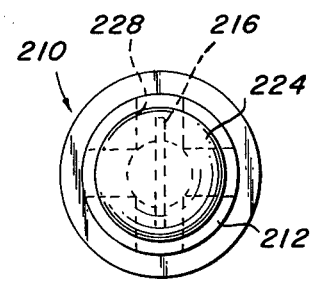
FIG. 7 is a left end view of FIG. 6.
Figure 8:
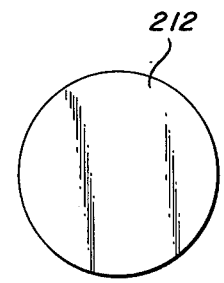
FIG. 8 is a right end view of FIG. 6.

Check valve 166 is urged to its upward closed position by spring 204 and to its downward open position by clamp screw 206 which is threaded into housing 156. In the closed position, O-ring 198 seats against the lower surface 208 of bushing 188 thereby preventing the passage of air under pressure to passageways 170 and 172 so that the supply of working fluid to plunger 78 is blocked. As shown in FIG. 5, when clamp screw 206 is screwed down, feed tube 20 will be held within the recessed area formed within housing 156. Only when the clamp screw 206 is in this position, will check valve 166 be opened.

Received within chamber 178 is an exhaust valve 210 which comprises valve body 212, stem 214 and retaining pin 216. O-rings 218 and 220 seal the annular chamber 222 formed between the reduced center section of valve body 212 and the walls of chamber 178. Stem 214 is provided with a spherical head 224 which seats against O-ring 226 when contacted by feed tube 20. Retaining pin 216 passes through a transverse bore 228 in body 212 and is frictionally retained within a transverse bore in stem 214. By this arrangement, stem 214 is retained within body 212 and air is permitted to pass through bore 228, through bore 230 around stem 214 and escape when stem head 224 is not seated against O-ring 226. When head 224 is seated, however, bores 230 and 228 are sealed. Since bore 228 is greater in diameter than retaining pin 216, valve stem 214 is permitted limited sliding action in body 212 between the position illustrated in FIG. 6 and the open position where retaining pin 216 would contact the left surface of bore 228. A cover plate 232 and screws 234 and 236 retain exhaust valve 210 within chamber 178.

Figure 11:
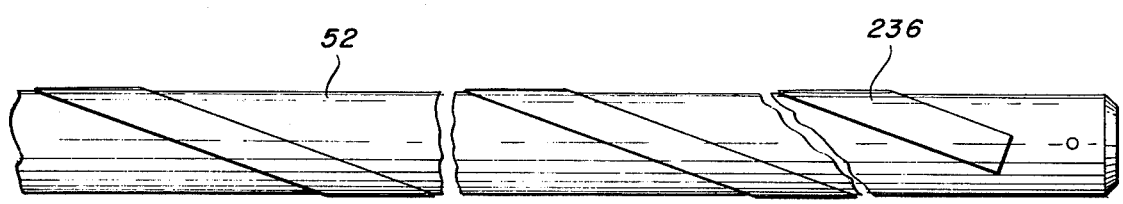
FIG. 11 is a fragmentary plan view of the inner concentric tube.

To provide a certain amount of vibration damping and noise reduction, inner concentric tube 52 has a length of resilient tape 236 spirally wrapped around it substantially along its entire length as shown in FIG. 11. Tape 236 is approximately as thick as the spacing of tubes 50 and 52 and serves to prevent them from vibrating and striking each other during operation of the apparatus. Even though tubes 50 and 52 are supported at their ends by caps 54 and 56, there may be a certain amount of sag along their length causing them to vibrate against each other. The tape 236 is preferably made of closed cell silicone rubber and adhesively secure to inner tube 52. It is commercially available from Connecticut Hard Rubber Co. of New Haven, Connecticut. In addition to good vibration damping and sound absorption, the strip should be resistant to oil and moisture and temperature changes. Other suitable material such as synthetic rubber, resilient plastics, felt-like material, etc. will be obvious.

OPERATION

Prior to loading a length of bar stock into feed tube 20, clamp screw 206 is screwed out to its upper position so that its tip 238 is sufficiently far above the surface 148 of arm 40 to permit the feed tube 20 to be passed underneath. In this position, the lower surface 240 of screw clamp 206, which overhangs valve stem 192, will be raised a sufficient distance to permit the O-ring 198 of stem 192 to seat against bushing 188. If pressurized air is then supplied to inlet 158 through filter and regulator 160, nipple 161 and passageway 164, it will be blocked by valve 166 so that working fluid will not be supplied to plunger 78. When feed tube 20 is swung laterally out of the recessed area formed within housing 156, exhaust valve stem 214 will no longer be forceably seated against O-ring 226 so that if clamp screw 206 were accidentally screwed down, the pressurized fluid within passageway 174 would be exhausted through passageways 176 and 177, annular chamber 222, bores 228 and 230 whereupon it would escape between the head 224 of valve stem 214 and O-ring 226. This additional safety feature provides virtually fail-safe operation since in no way can pressurized working fluid be admitted to feed tube 20 unless the same is locked into position against exhaust valve head 224 thereby causing it to seat against O-ring 226.

When feed tube 20 is swung laterally outward, plunger 78 is pushed back within tube 20 by a length of bar stock (not shown). Due to the conical surface 108 of tip 86, the stock will automatically be centered within tube 20. Plastic bushings 70 are then replaced within front end cap 54 around the portion of the bar stock which is protruding. Feed tube 20 with the enclosed stock is then swung laterally within the recess formed in housing 156 until it contacts exhaust valve 224 causing it to seat against O-ring 226. At this point, the exhaust system is blocked so that air cannot flow through passageway 176, annular chamber 222 and bores 228 and 230. With feed tube 20 in this position, screw clamp 206 is screwed down causing its tip 238 to engage tube 20 and clamp it against the abutment formed by exhaust valve head 224. With pressurized working fluid supplied to inlet 158, it will flow through filter and regulator 160, nipple 161, passageway 164 and into chamber 162. With screw clamp 206 in its downward position, check valve stem 192 will be contacted by lower surface 240 and unseated. This permits the working fluid to flow around stem 192 through passageways 168 and 170 into annular chamber 172, passageway 174 and into hose 180 through connector 182. Since exhaust valve 210 is closed, the air will not be diverted from port 181. From hose 180, it will flow through connector 184, oiler 186 and connector 144 into the annular chamber 68 formed between inner and outer tubes 52 and 50. It will flow down annular chamber 68 through the spiral passageway formed by tape 236, through port 142 to the interior 66 of inner tube behind packing 130. This will cause plunger 78 to advance within feed tube 20 feeding the bar stock through the spindle of lathe L in a manner well known in the art. As the spindle is rotated, this rotation will be transmitted to tip 108 which is free to rotate within guide 84 by virtue of bearings 114 and 116. When the stock has advanced to the point where guide 84 contacts the spindle, it will begin to rotate with respect to plunger body 80 and sleeve 82. It should be noted that the diameter of plunger sleeve 82 is slightly less than that of body 80 and guide 84 and that body 80 and sleeve 82 at no time rotate within feed tube 20.

When the end of the bar stock has been reached, feed tube 20 can again be swung laterally for loading by unscrewing screw clamp 206 thereby causing check valve 166 to seat and assuring that the supply of pressurized working fluid to plunger 78 is interrupted. The absence of feed tube 20 will also permit exhaust valve head 224 to unseat so that if pressure should accidentally be supplied to the supply hose 180 through passageway 174, it will be exhausted through passageway 176 and exhaust valve 210.

Although the preferred embodiment described herein has been shown as including a mechanically actuated exhaust valve, alternative arrangements may also be employed. For example, an electrical limit switch could be mounted on arcuate surface 154 and electrically connected to an exhaust valve which could then be operated by means of a solenoid. The important requirement for any exhaust system employed is that is actually senses the physical presence of the feed tube in its locked or operative position. This feature constitutes a significant improvement over prior art devices wherein the supply of working fluid is interrupted solely by means of the position of the locking mechanism. By combining a directly actuatable exhaust mechanism of this type with a locking device controlled fluid valve, virtually fail-safe operation is realized.

While this invention has been described as having a preferred design, it will be understood that it is capable of further modification. This application is, therefore, intended to cover any variations, uses or adaptations of the invention following the general principles thereof and including such departures from the present disclosure as come within or known customary practice in the art to which this invention pertains, and as may be applied to the essential features hereinbefore set forth and fall within the scope of this invention or the limits of the appended claims.

We claim:
1. Bar stock feed apparatus comprising:
  (a) an elongated tubular member adapted to receive a length of bar stock therein,

(b) standard means for supporting said tubular member in an operative position for feeding the bar stock and in an inoperative position wherein bar stock can be loaded into said tubular member,
(c) a fluid actuated plunger received in said tubular member for longitudinal movement therein,
(d) means for supplying fluid under pressure to said tubular member behind said plunger to thereby cause said plunger to advance longitudinally within said tubular member,
(e) a locking mechanism associated with said standard means including means for mechanically constraining said tubular member in said operative position,
(f) pressure responsive safety valve means associated with said standard means adapted to be connected to said fluid supply means responsive to the presence of said tubular member when in operative position to automatically permit a supply of fluid to said plunger and responsive to the absence of said tubular member from said operative position to automatically interrupt or reduce the supply of fluid to said plunger,
(g) said plunger comprising at least two coaxial sections connected for unitary axial movement and for a relative rotational movement about their axis and wherein the forward one of said two sections includes means for receiving one end of a length of bar stock.

2. Bar stock feed apparatus as in claim 1 and wherein:
(a) said plunger includes a third section connected to the rear one of said two sections for unitary axial movement therewith and relative coaxial rotational movement with respect thereto.

3. Bar stock feed apparatus as in claim 1 and wherein:
(a) said means for receiving one end of a length of bar stock comprises a socket having a conical inner surface.

4. Bar stock feed apparatus comprising:
(a) an elongated tubular member adapted to receive a length of bar stock therein
(b) standard means for supporting said tubular member in an operative position for feeding the bar stock and in an inoperative position wherein bar stock can be loaded into said tubular member
(c) a fluid actuated plunger received in said tubular member for longitudinal movement therein
(d) means for supplying fluid under pressure to said tubular member behind said plunger to thereby cause said plunger to advance longitudinally within said tubular member
(e) said standard means including a bar stock support arm
(f) said bar stock support arm including a housing (g) said housing including a locking mechanism, check valve means, and pressure responsive safety valve means
(h) said locking mechanism including means for operating said check valve means
(i) fluid passageway means connecting said check valve means to said safety valve means and to said means for supplying fluid under pressure
(j) said locking mechanism inluding means for mechanically constraining said tubular member in said operative position and
(k) said pressure responsive safety valve means responsive to the presence of said tubular member when in operative position to automatically permit a supply of fluid to said plunger and responsive to the absence of said tubular member from said operative position to automatically interrupt or reduce the supply of fluid to said plunger.

5. Bar stock feed apparatus as in claim 4 and wherein:
(a) said check valve means includes means for interrupting the supply of fluid under pressure to said plunger.

6. Bar stock feed apparatus as in claim 5 and wherein:
(a) said bar stock support arm includes an abutment for positioning said tubular member in its operative position, and
(b) said locking mechanism includes means for clamping said tubular member against said abutment.

7. Bar stock feed apparatus as in claim 6 and wherein:
(a) said safety valve means is associated with said abutment and is directly responsive to said tubular member being clamped against said abutment to reduce or interrupt the supply of fluid to said plunger.

8. Bar stock feed apparatus as in claim 7 and wherein:
(a) said safety valve means includes a movable actuator on the surface of said abutment positioned to be contacted by said tubular member when in its operative position.

9. Bar stock feed apparatus as in claim 4 and wherein:
(a) said tubular member comprises two concentric tubes defining an annular fluid passageway and including a fluid inlet to said passageway.

10. Bar stock feed apparatus as in claim 9 and wherein:
(a) said tubular member is closed at one end and said fluid inlet is located near the other end of said tubular member.

11. Bar stock feed apparatus as in claim 10 and including:
(a) a strip guide bushing supported within said inner tube.

12. Bar stock feed apparatus as in claim 9 and including: (a) a spiral vibration damping strip wound on the inner one of said concentric tubes in said annular passageway.

13. Bar stock feed apparatus as in claim 12 and wherein:
(a) said strip is a resilient tape adhesively secured to said inner tube.

14. Bar stock feed apparatus as in claim 9 and including:
(a) a longitudinally running strip of material positioned in said annular passageway and spacing said concentric tubes along their lengths.

15. Bar stock feed apparatus as in claim 14 and wherein:
(a) said strip is made of silicone rubber.

16. Bar stock feed apparatus as in claim 14 and wherein: (a) said strip is adhesively secured to the inner one of said concentric tubes.

17. Bar stock feed apparatus as in claim 4 and wherein:
(a) said standard means comprises a pair of arms each supported on a tripod.

18. Bar stock feed apparatus as in claim 4 and wherein:
(a) said standard means includes a surface for supporting said tubular member in a plurality of postions including operative and inoperative positions, and
(b) said safety valve means includes an actuator directly responsive to presence of said tubular member in said operative position.

19. Bar stock feed apparatus as in claim 18 and wherein:
(a) said actuator is movable and is positioned to be contacted by said tubular member when in its operative position.

20. Bar stock feed apparatus as in claim 4 and wherein:
(a) said bar stock support arm is generally L-shaped and including a support surface extending in a generally horizontal direction and having a portion of said surface extending in a generally vertical direction therefrom and including an abutment.

21. Bar stock feed apparatus as in claim 20 and wherein:
(a) said safety valve means includes a movable actuator extending from said abuttment.

22. Bar stock feed apparatus as in claim 20 and wherein:
(a) said bar stock support arm includes a portion which extends above said tubular member when in its operative position, and
(b) said locking mechanism includes a downwardly extending locking screw positioned to contact said tubular member when in its operative position and clamp said tubular member against said abutment.

23. Bar stock feed apparatus as in claim 22 and wherein:
(a) said means for supplying fluid includes said check valve means operated by said locking screw for admitting fluid under pressure to said plunger when said locking screw is positioned to contact said tubular member and interrupting the supply of fluid to said plunger when said locking screw is positioned to release said tubular member.

* * * * *

UNITED STATES PATENT AND TRADEMARK OFFICE
CERTIFICATE OF CORRECTION

PATENT NO. : 4,129,220
DATED : December 12, 1978
INVENTOR(S) : Anders A. Peterson and Francis D. Catlin It is certified that error appears in the above-identified patent and that said Letters Patent are hereby corrected as shown below:

Column 8, line 18, cancel "reduce or interrupt" and insert --permit-- therefore.

Signed and Sealed this

Third Day of July 1979

[SEAL]

Attest:

Attesting Officer

LUTRELLE F. PARKER
Acting Commissioner of Patents and Trademarks